July 13, 1965 J. MARLEY 3,195,025

MAGNETIC DEFLECTION YOKE

Original Filed April 25, 1956 6 Sheets-Sheet 1

MAGNETIC DEFLECTION YOKE

MAGNETIC DEFLECTION YOKE

Original Filed April 25, 1956

United States Patent Office 3,195,025
Patented July 13, 1965

3,195,025
MAGNETIC DEFLECTION YOKE

John Marley, Wayne, N.J., assignor to Hazeltine Research, Inc., Chicago, Ill., a corporation of Illinois Original application Apr. 25, 1956, Ser. No. 580,600, now Patent No. 3,115,544, dated Dec. 24, 1963. Divided and this application Oct. 15, 1963, Ser. No. 316,310
11 Claims. (Cl. 317—200)

GENERAL

This application is a division of U.S. Patent No. 3,115,-544, issued December 24, 1963, entitled "Color-Television Receivers and Deflection Yokes."

This invention relates to color-television receivers and, particularly, to such receivers of the projection type where images of different colors are projected onto a viewing screen in a superimposed manner to form the composite multicolor image seen by the viewer. This invention also relates to magnetic deflection yokes which are necessary in such receivers but which also have fields of application above and beyond such receivers.

An undesirable feature of large screen color-television receivers, that is, receivers having about a 21-inch picture screen, where such color receivers utilize a single three-color direct-view cathode-ray tube for producing the desired color image, is the relatively long physical length of such direct-view tubes. In general, this long tube length requires that the depth of the receiver cabinet from front to back be of a corresponding length and, hence, causes the cabinet to be unduly bulky and of unattractive proportions for use in the average home. Another disadvantage of a receiver using such a direct-view tube is the high cost of tube replacement when the direct-view cathode-ray tube has to be replaced.

These disadvantages can be overcome to a great extent by using a three-tube image-projection system inside of the receiver cabinet in place of the single direct-view cathode-ray tube as described more fully in U.S. Patent No. 2,845,850, issued July 29, 1958, entitled "Optical Structure for Color-Image-Reproducing Apparatus of the Projection Type," and U.S. Patent No. 2,752,419, issued June 26, 1956, entitled "Color-Image-Reproducing Apparatus of the Projection Type." Briefly, such projection system utilizes three small cathode-ray tubes having, for example, 2½-inch phosphor screens for individually forming red, green, and blue component images. These component images are then optically projected towards a pair of crossed dichroic mirrors which serve to combine the three individual light paths into a single coincident light path which, in turn, is directed by a plane mirror onto the viewing screen of the receiver cabinet to form the desired multicolor image. A problem which occurs with image-projection systems is that of keeping the three component images accurately superimposed on the viewing screen. Lack of superposition is commonly referred to as "misregistration." Typical causes of such misregistration and the cures therefor are dealt with in the above-mentioned patents.

The dichroic mirror construction described in these patents provides a compact projection unit that does not require an excessive front-to-back cabinet depth. Accordingly, the receiver cabinet has dimensions which are more suitable for the average home. As of this time, on the basis of incomplete preproduction estimates, it appears that the initial cost of the complete optical unit may be about the same or perhaps a little less than the cost of a direct-view cathode-ray tube having a corresponding viewing screen size. In any event, however, the cathode-ray tube replacement cost will be considerably smaller in the case of the image-projection system because of the low cost of a small cathode-ray tube that need develop an image in only a single color.

It is desirable, however, that the cabinet size and the cost of the projection-type color receiver be reduced even further. The cabinet size can be further reduced by eliminating the crossed dichroic mirrors and positioning the optical projection units associated with each cathode-ray tube in a more space-conserving manner. Elimination of the dichroic mirrors is also a substantial cost reduction. It is found, however, that if the dichroic mirrors are eliminated, then superposition of the component red, green, and blue images on the viewing screen can only be obtained by converging the corresponding image light paths towards a common point. This convergence, however, causes oblique incidence on the viewing screen of image light from at least two of the cathode-ray tubes. Such oblique incidence of image light causes variations in lateral magnification for different portions of the same component image when viewed on the viewing screen. This constitutes a form of image distortion commonly referred to as "keystone" distortion. Such distortion causes the outline of a projected rectangular image to be in the form of a keystone. Even more serious, however, is the fact that such distortion produces varying degrees of misregistration between the different component images over the entire image area of the viewing screen. The consequent color distortion would not produce a satisfactory color image. Accordingly, it would be desirable to have some means for minimizing such distortion in order to enable the advantages of reduced cabinet size and reduced cost to be obtained.

The problem of keystone distortion of an image has been previously encountered in the prior art in the case of monochrome television where an iconoscope image pickup type cathode-ray tube was used at the transmitter. Such iconoscope pickup tube produced keystone distortion because of the oblique incidence of electron-beam energy on the phosphor image surface of such tube. The conventional technique for correcting such keystone distortion was to control or modulate the amplitude of the scanning currents supplied to the deflection yoke of the iconoscope so that the length of a line scan is increased over the image portion corresponding to the narrow part of the keystone wedge and decreased for the image portion corresponding to the wide part of the keystone wedge. This, in effect, restored the raster outline to a rectangular shape. Such correction was generally applied, however, in only one direction of the image. Such type of correction was tolerable in the case of monochrome television but is unsuitable for use in a color-television projection system where three separate images must be accurately superimposed in both vertical and horizontal dimensions over the entire image area in order to prevent color distortion.

Theoretically, the scanning currents supplied to the deflection yoke could be shaped in a more complex manner to correct the image distortion due to keystone in both the vertical and horizontal directions. This would, however, require relatively complex circuitry and, if used in the image-projection system, would require a separate set of deflection circuits for each of the three cathode-ray tubes of such system. Also, such circuits would have to be accurately synchronized with one another and would have to be closely regulated to ensure adequate registration. Accordingly, it would be desirable to have some less complex and less costly means for minimizing such distortion in an image-projection system.

Another factor which is of some importance in color-television receivers is the effect of the earth's magnetic field in producing unequal extraneous deflections of the three red, green, and blue electron beams. Such differences in deflection produce misregistrations of the three component images and, in the case of a dichroic mirror type projection system, are bothersome because one of the component images is scanned in a direction opposite to the other two. The difference in such extraneous deflections could be minimized if the principal axes of the three electron beams could be placed parallel to one another and the three electron beams caused to scan in the same direction. Accordingly, it is desirable in a color-projection system to be able to utilize a form of construction which enables this condition to be obtained.

It is an object of the invention to provide a new and improved magnetic deflection yoke for use with cathode-ray tube image-reproducing system for minimizing image distortion seen by the viewer.

It is another object of the invention to provide a new and improved magnetic deflection yoke for use with cathode-ray tube image-reproducing systems of the color-projection type for counteracting image distortion due to the oblique incidence of energy on an image surface.

In accordance with the invention, a magnetic deflection yoke for use with a cathode-ray tube image-reproducing system where oblique incidence of energy on an image surface causes image distortion comprises yoke coils for forming the scanning raster of the cathode-ray tube, the relative axial dimensions of the yoke coils being proportioned to produce oblique end boundaries of the magnetic deflection fields for minimizing the image distortion seen by the viewer.

In accordance with another object of the invention, a magnetic deflection yoke for use with a cathode-ray tube image-reproducing system for altering the shape of the cathode-ray tube raster to minimize image distortion seen by the viewer comprises yoke coils for deflecting the electron beam of the cathode-ray tube to form the scanning raster, the yoke coils comprising longitudinal groups of conductors which are to be positioned alongside of the longitudinal axis of the cathode-ray tube, the conductor groups being positioned relative to one another around the tube axis to produce curvature of the magnetic deflection fields over the central region of the yoke, that curvature being asymmetrical with reference to at least one of two mutually perpendicular reference planes having their line of intersection positioned essentially along the tube axis for obtaining the desired alteration of the raster.

For a better understanding of the present invention, together with other and further objects thereof, reference is had to the following description, taken in connection with the accompanying drawings, and its scope will be pointed out in the appended claims.

Referring to the drawings:

FIG. 1*a* is a cross-sectional view of a representative embodiment of a color-television receiver constructed in accordance with the present invention;

FIG. 1*b* is a perspective view of the color-television receiver of FIG. 1*a*;

Figure 5A:
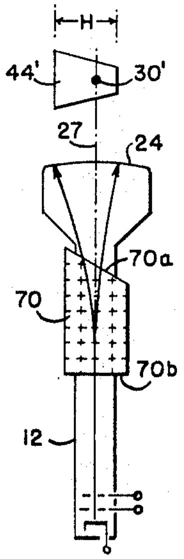
Figure 5B:
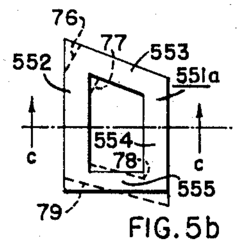
Figure 5C:
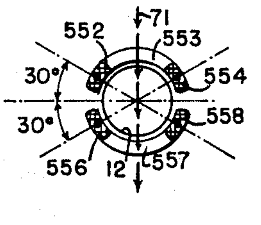
Figure 6A:
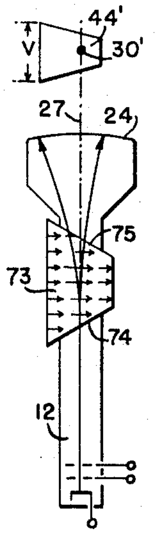
Figure 6B:
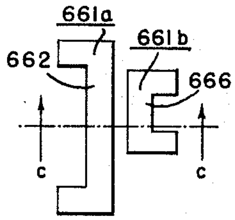
Figure 6C:
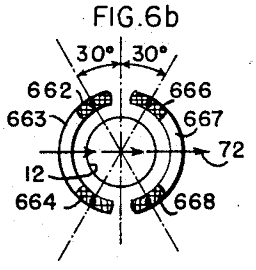
Figure 7A:
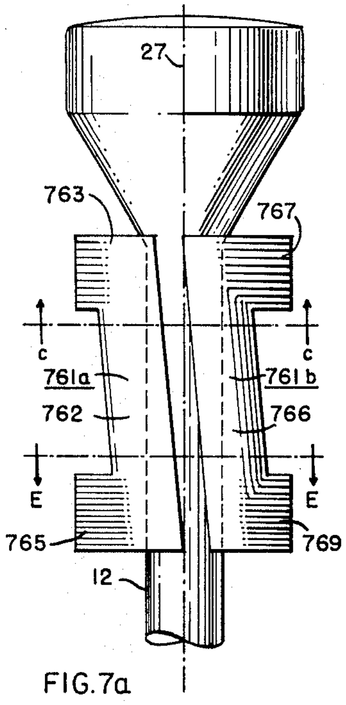
Figure 7B:
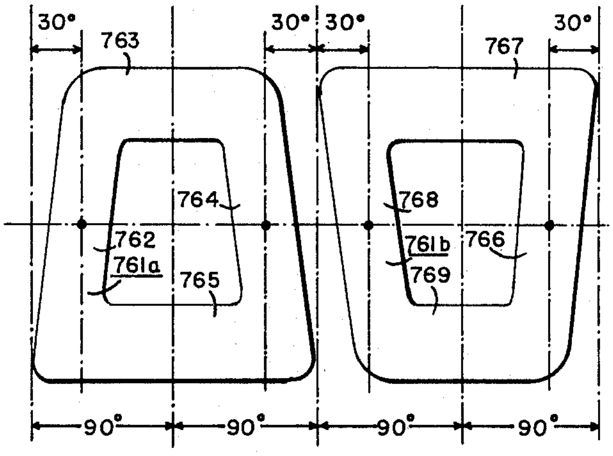
Figure 7C:
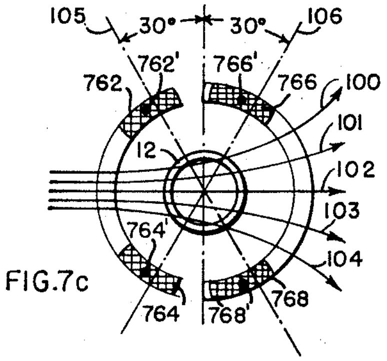
Figure 7D:
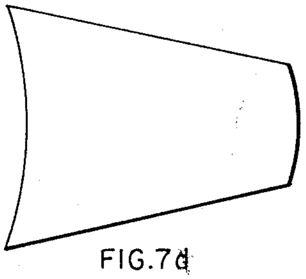
Figure 7E:
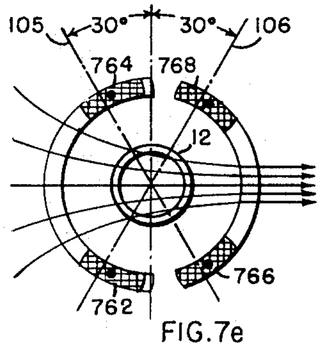
Figure 7F:
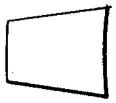

FIG. 5*a* is a plan view of the magnetic deflection field produced by one type of horizontal deflection coils constructed in accordance with the present invention;

FIG. 5*b* is a plan view of the horizontal deflection coils which produce the magnetic deflection field of FIG. 5*a*;

FIG. 5*c* is a cross-sectional view taken on the section line C—C of FIG. 5*b*;

FIG. 6*a* is a plan view of the magnetic deflection field produced by one type of vertical deflection coils constructed in accordance with the present invention;

FIG. 6*b* represents a plan view of the vertical deflection coils which produce the magnetic deflection field of FIG. 6*a*;

FIG. 6*c* is a cross-sectional view taken along the section line C—C of FIG. 6*b*;

FIG. 7*a* is a plan view of another type of vertical deflection coils constructed in accordance with the present invention;

FIG. 7*b* shows the coils of FIG. 7*a* laid out flat;

FIG. 7*c* is a cross-sectional view taken along the section line C—C of FIG. 7*a*;

FIG. 7*d* illustrates the outline of the region scanned by the electron beam along the section line C—C of FIG. 7*a*;

FIG. 7*e* is a cross-sectional view taken along the section line E—E of FIG. 7*a*;

FIG. 7*f* illustrates the outline of the region scanned by the electron beam along the section line E—E of FIG. 7*a*.

Figure 10A:
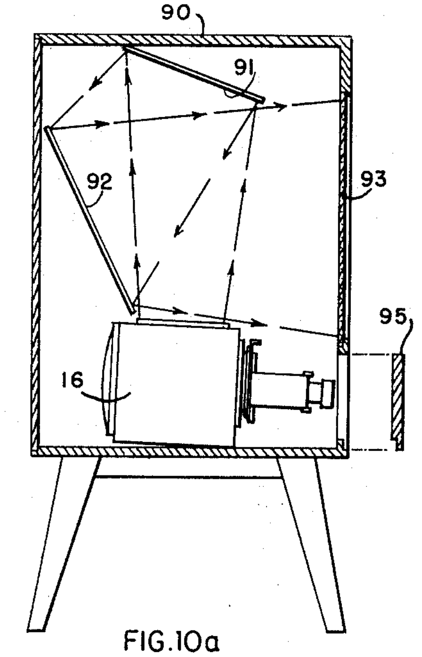
Figure 10B:
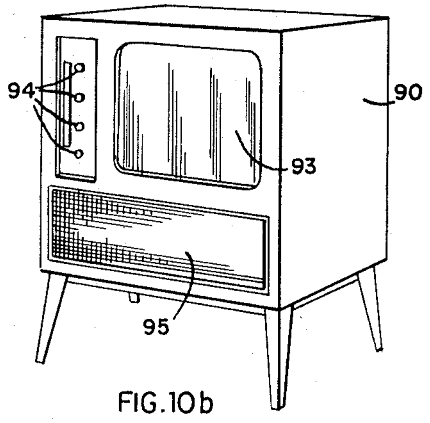
Figure 8A:
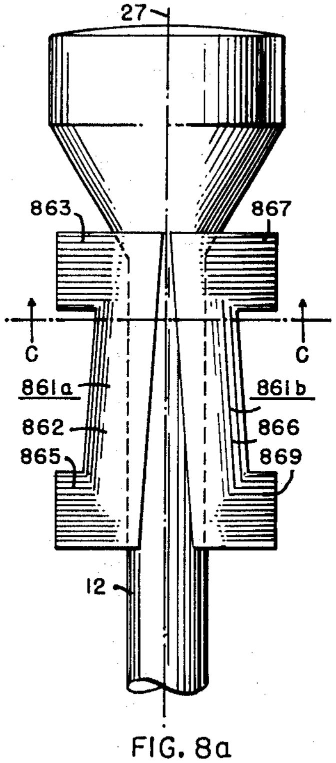
Figure 8B:
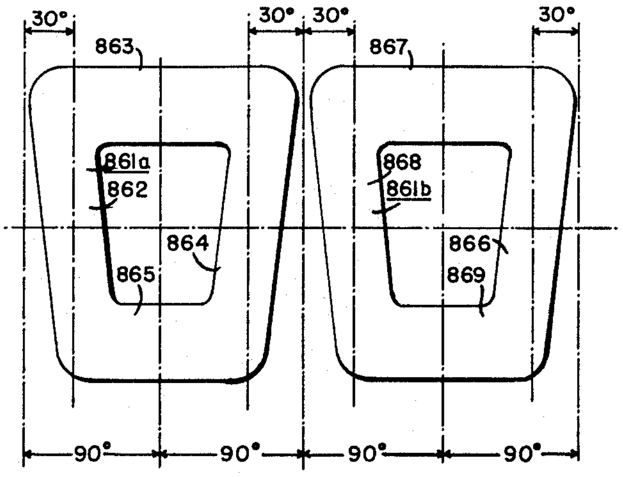
Figure 8C:
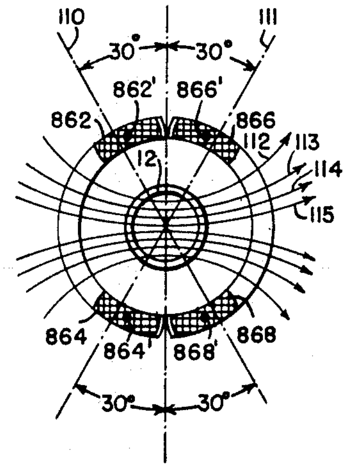
Figure 8D:
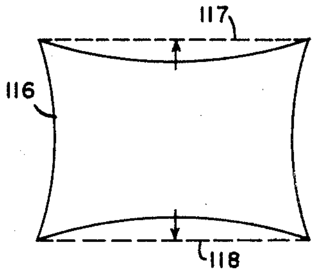
Figure 9A:
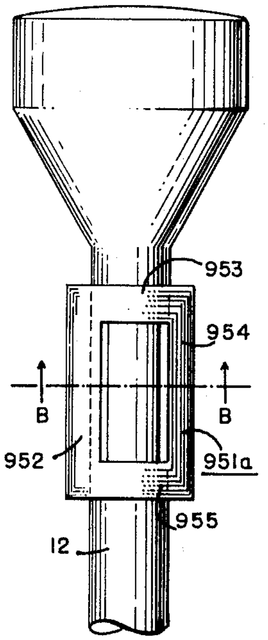
Figure 9B:
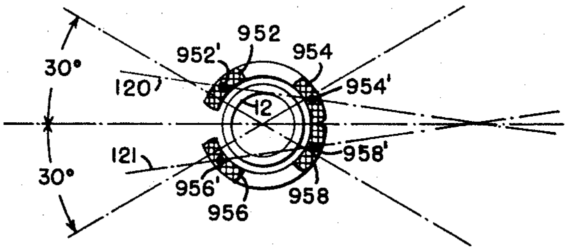
Figure 9C:
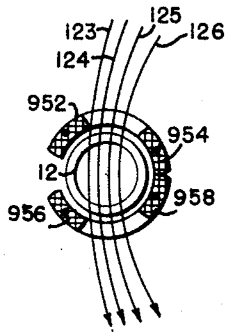
Figure 9D:
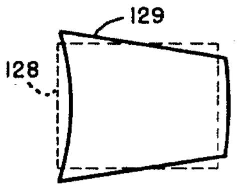

FIG. 8*a* is a plan view of a further type of vertical deflection coils constructed in accordance with the present invention;

FIG. 8*b* shows the coils of FIG. 8*a* laid out flat;

FIG. 8*c* is a cross-sectional view taken along the section line C—C of FIG. 8*a*;

FIG. 8*d* illustrates the outline of the region scanned by the electron beam along the section line C—C of FIG. 8*a*;

FIG. 9*a* is a plan view of another type of horizontal deflection coils constructed in accordance with the present invention;

FIG. 9*b* is a cross-sectional view taken along the section line B—B of FIG. 9*a*;

FIG. 9*c* is the same as FIG. 9*b* except that it shows the flux lines of the magnetic deflection field;

FIG. 9*d* shows the effect of the flux field of FIG. 9*c* on the cathode-ray tube raster pattern;

FIG. 10*a* is a cross-sectional view of a table-model type of color-television receiver constructed in accordance with the present invention, and FIG. 10*b* is a perspective view of the color-television receiver of FIG. 10*a*.

*Description of color-television receiver and image-projection system*

Figure 1A:
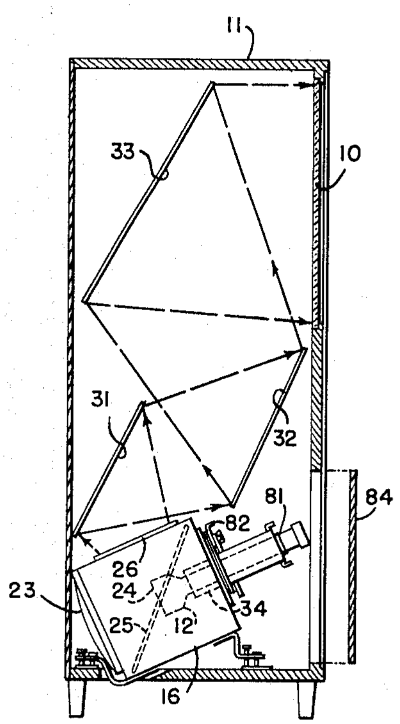

Referring now to FIG. 1*a* of the drawings, there is shown a representative embodiment of a color-television receiver of compact dimensions constructed in accordance with the present invention and including a color-projection system where images of different colors are projected onto a viewing screen 10 in a superimposed manner to form a composite color image. The viewing screen 10 is mounted in an opening in the upper portion of the front side of the cabinet 11 of the receiver. The color-television receiver comprises cathode-ray tube image-reproducing units for individually forming component color images of a composite color image, the units being adjusted to project component images along converging light paths to superimpose such images on the viewing screen 10 of the receiver. Such image-reproducing units include cathode-ray tubes 12, 13, and 14, best seen in FIG. 2, for individually forming component color images of a composite color image. The cathode-ray tubes are of a small size having, for example, a 2½-inch phosphor screen and the cathode-ray tube 12 may, for example, be used to form a red image while the cathode-ray tubes 13 and 14, for example, form green and blue images, respectively. The desired color may be imparted to the image formed by each cathode-ray tube in one of two alternative ways. A first method is to use the appropriate color phosphors for the phosphor screens of the three tubes. An alternative is to use a white phosphor on the phosphor screens of all three tubes and to insert separate color filters in front of the individual cathode-ray tubes. In either event, the cathode-ray tubes serve to form the desired component color images.

Figure 2:
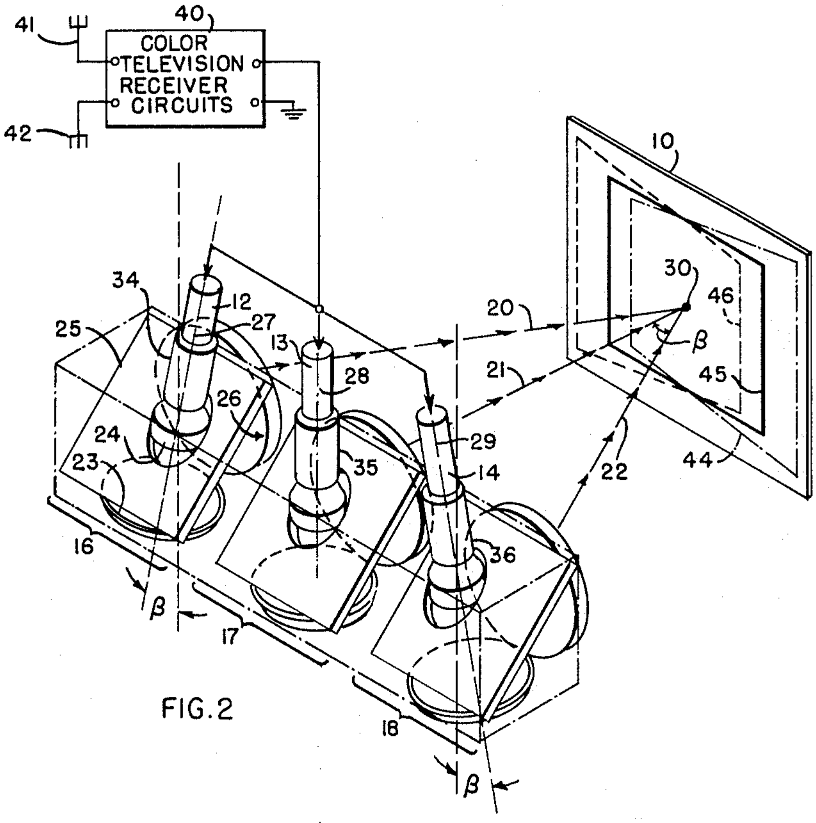
FIG. 2 is a partly schematic view of a portion of the color-television receiver of FIG. 1*a*.

The cathode-ray tube image-reproducing units also include individual optical projection units 16, 17 and 18 for each cathode-ray tube, such units being adjusted to project the component images along converging light paths 20, 21, and 22, as shown in FIG. 2, to superimpose such images on the viewing screen 10. It should be noted that the optical system, as shown in FIG. 2, has been simplified for explanatory purposes by not showing certain portions of the FIG. 1*a* receiver and by showing the converging light paths 20, 21, and 22 as converging directly onto the viewing screen 10. Considering, for example, the optical projection unit 16 associated with the cathode-ray tube 12 in more detail, such unit may be a Schmidt optical system which includes a spherical mirror 23 located opposite the phosphor screen 24 of the cathode-ray tube 12 for enlarging the image that is projected onto the viewing screen 10, i.e., such mirror is analogous to a projection lens. The Schmidt optical projection unit may, as shown in both FIG. 1*a* and FIG. 2, be of the folded type, i.e., include an internal plane mirror 25 placed at a 45° angle for changing the direction of the light rays reflected by the spherical mirror 23, thus producing a fold in the light path. Such 45° mirror has a hole in the center thereof so as not to block the image from the cathode-ray tube 12. The optical unit further includes a correction lens 26 located, optically speaking, at a distance corresponding to the radius of curvature of the spherical mirror 23 for correcting for spherical aberration.

The optical projection units 17 and 18 associated with the other cathode-ray tubes 13 and 14 may also be of the Schmidt type and include the same elements as the optical unit associated with the cathode-ray tube 12, as shown in FIG. 2. In order to conserve space within the receiver cabinet, the optical projection units 16, 17, and 18 associated with the three cathode-ray tubes should be positioned side-by-side in a line, as shown in FIG. 2. As a consequence, the longitudinal axes 27, 28, and 29 of the cathode-ray tubes 12, 13, and 14 are coplanar and nearly parallel, the nearly parallel relationship together with the fact that the three electron beams will scan in the same direction serving to minimize differences in the extraneous deflections of the electron beams which are caused by the earth's magnetic field.

The color-television receiver also includes multiple light reflectors common to the converging light paths and positioned to provide multiple folds in such light paths thereby requiring a minimum of cabinet space. Such light reflectors are represented in FIG. 1*a* by the multiple mirrors 31, 32, and 33 which are external to the Schmidt optical units 16, 17, and 18 associated with each of the cathode-ray tubes 12, 13, and 14.

The color-television receiver further includes beam deflection means for each cathode-ray tube whose projected image is distorted for predistorting such image in a reverse sense to substantially cancel such distortion, thereby enabling the different color images to be substantially in register with one another over the entire image area of the viewing screen 10. The beam deflection means for each such cathode-ray tube includes first beam deflection means for predistorting such image in a vertical image direction and second beam deflection means for predistorting such image in a horizontal image direction, the combination of such vertical and horizontal precorrections serving to substantially cancel the distortion seen by the viewer. Each of the cathode-ray tubes 12, 13, and 14 includes a magnetic deflection yoke, as represented by deflection yokes 34, 35, and 36 in FIG. 2, for forming the normal scanning raster thereof. The yoke coils for each cathode-ray tube whose projected image is distorted, in this case the cathode-ray tubes 12 and 14, may, in accordance with the present invention, be shaped to produce the desired predistortion and, hence, in this case also constitute the beam deflection means for producing such predistortion in addition to their normal task of producing the scanning raster of the tubes. As a result, each of the deflection yokes 34 and 36 includes a first set of deflection coils which are shaped to predistort such image in a horizontal image direction and a second set of deflection coils which are shaped to predistort such image in a vertical image direction. By "image direction" is meant the image directions on the viewing screen 10.

The color-television receiver also includes the usual electronic circuits for amplifying, detecting, selecting, matrixing, etc. the desired color-television signal components and such circuits are represented schematically by the unit 40 which is labelled "color-television receiver circuits." In addition, such unit 40 includes the usual circuits for developing the supply voltages and deflection currents required by the cathode-ray tubes 12, 13, and 14. The transmitted color-television signal is intercepted by an antenna system 41, 42 and supplied thereby to the color-television receiver circuits 40 in a conventional manner. These circuits represented by the unit 40 are not shown in FIG. 1*a* but, as indicated by the control knobs 43 in FIG. 1*b*, may be positioned on a vertically mounted chassis on the right-hand side of the receiver cabinet 11.

*Operation of color-television receiver and image-projection system*

Considering now the operation of the apparatus just described, the color-television signal transmitted by the transmitting station is intercepted by the antenna system 41, 42, which may be external to the receiver proper, and supplied to the color-television receiver circuits 40. Such circuits operate in a conventional manner to amplify, detect, and separate the various component parts of the received signal. More particularly, the monochrome and color-difference signal components are derived and are combined to produce the three desired red, green, and blue color signals which, in turn, are supplied to the control electrodes (not shown) of the corresponding red, green, and blue cathode-ray tubes 12, 13, and 14. Also in a conventional manner, suitable synchronized deflection or scanning currents are developed by the circuits 40 and supplied to the deflection yokes 34, 35, and 36 associated with the cathode-ray tubes 12, 13, and 14. An advantage of the present invention is that the deflection coils of the different deflection yokes 34, 35, and 36 may be connected in parallel so that only a single horizontal circuit is needed for developing the horizontal scanning current and, similarly, only a single vertical deflection circuit is needed for developing the vertical scanning current. These scanning currents are of the conventional saw-tooth shape. The circuits 40 also operate in a conventional manner to develop the various operating potentials which are required by the electrodes (not shown) of the cathode-ray tubes.

As a result, a red image representing the red component of the total color image is formed on the phosphor screen 24 of the cathode-ray tube 12. In a similar manner, green and blue component images are formed on the phosphor screens of the cathode-ray tubes 13 and 14, respectively. Each of these component images is then projected by the respective optical units 16, 17, and 18 along converging light paths 20, 21, and 22 to be as nearly as possible superimposed on the viewing screen 10. Though not shown in the simplified drawing of FIG. 2, all three images are reflected by each of the external mirrors 31, 32, and 33 of FIG. 1*a*, each mirror being common to all three of the light paths 20, 21, and 22.

Because of the fact that the optical projection units 16 and 18 project the corresponding component images along light paths 20 and 22 which are incident on the viewing screen 10 at oblique angles, special provisions must be made to ensure that the images are in focus over the entire area of the viewing screen. There are two alternatives which may be utilized to obtain this focus, depending on how the optical units are adjusted to project the images along converging light paths. One method, which is not the one shown in FIG. 2, is to physically position the two end optical units 16 and 18 so that the units as a whole are toed-in to project the images along the converging paths 20 and 22, the middle optical unit 17 being in a center position and aimed straight ahead at the center 30 of the viewing screen 10. In this case, the images from the optical units 16 and 18 are not in focus because the oblique angle of incidence causes the optical throw distance, that is, the distance between the optical units and the viewing screen 10 to be different for different portions of the image. This lack of focus may be corrected by tilting the face of each of the cathode-ray tubes 12 and 14 in an asymmetrical manner with respect to the corresponding spherical mirrors so that the phosphor screen to mirror distances differ in a proportionate manner for the different portions of each image. This method is not shown in FIG. 2 but may be used in place of the one there shown if desired.

The second method of producing image focus for the side-projected images, which method is the one shown in FIG. 2, is to position the three optical units 16, 17, and 18 so that they point straight ahead and would, hence, cause their images to be incident along paths at right angles to the viewing screen 10. The two side images are then made to superimpose on the center image by tilting each of the cathode-ray tubes 12 and 14 about the center of curvature of the tube face so that each tube face, which has a spherical contour, remains concentric with the corresponding spherical mirror. As shown in FIG. 2, the tilt is towards the center cathode-ray tube 13 and the magnitude of the tilt angle $\beta$ is the same as the angle of incidence of the image paths 20 and 21 on the viewing screen 10. This, in effect, shifts the center of each image in the appropriate manner so that the chief image rays from the center of each shifted image follow the converging light paths 20 and 22, respectively. This does not affect the image focus because the focal surface of a Schmidt optical system is spherical and concentric with the spherical mirror.

Regardless of which method is utiilzed for obtaining image focus, however, another phenomenon arises which must also be taken into account, namely, the so-called "keystone" distortion which is caused by the oblique incidence on the viewing screen 10 of the image paths for the two side optical units 16 and 18. Assuming that a rectangular raster is formed on the phosphor screen 24 of the cathode-ray tube 12, then the projected image which appears on the viewing screen 10 is represented by the keystone-shaped outline 44. The image is in focus over the entire image area, but suffers keystone distortion due to the variations in lateral magnification which arise due to the variations in the distance between the optical unit 16 and the viewing screen 10 for different portions of the image. In a corresponding manner, a rectangular image raster on the phosphor screen of the cathode-ray tube 14 produces on the viewing screen 10 keystone-shaped outline 46. The image projected by the center optical unit 17 is, of course, properly reproduced and its viewing screen outline is indicated by the outline 45.

Figure 3:
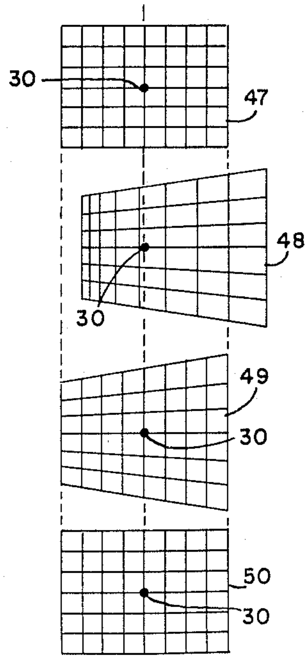
FIG. 3 illustrates various viewing screen images produced by a single cathode-ray tube projection unit when a mesh-type test pattern is applied thereto.

Referring now to FIG. 3 of the drawings, there will be seen the precise nature of this so-called keystone distortion. Assuming for the moment that a mesh-type test pattern is supplied to the cathode-ray tube 12, then such test pattern when projected onto the viewing screen 10 should appear as shown by the test pattern 47 of FIG. 3. In particular, the vertical and horizontal lines should be evenly spaced. Because of the oblique incidence of the image on the viewing screen 10, the test pattern will actually appear as indicated by the test pattern 48. It will be noted that, in addition to the keystone shape of the outline of the test pattern 48, the vertical lines are no longer evenly spaced and the horizontal lines converge towards the narrow side of the keystone. This means that for every image point, except the center 30, the red image elements will not be in register with the corresponding green elements of the normal image projected by the center optical unit 17. Similarly, there will be a lack of registration for each element of the blue component image projected by the optical unit 18. Such lack of registration produces an intolerable amount of color distortion.

The FIG. 3 test patterns also clearly indicate that the viewing screen image distortion for the optical units 16 and 18 cannot be corrected by merely correcting the keystone distortion in one direction as was done in the prior art in the case of monochrome television. In other words, correction in one direction, though it restores the image outline to a rectangle, does not correct the image distortion in the other direction and, hence, misregistration of the three component images would still occur. Test pattern 49 indicates the image that would appear on the viewing screen 10 if the image were corrected in only the horizontal direction, in which case the vertical lines are evenly spaced as desired but the horizontal lines still converge towards one side of the image. Further correction in the vertical direction is needed to produce the desired test pattern as shown by test pattern 50.

From the foregoing, it is apparent that some means for correcting the keystone distortion must be provided before the advantages that accrue when the dichroic mirrors are eliminated may be attained. There is nothing in the prior art which suggests a practical solution to this problem and affords complete correction of the image distortion caused by oblique incidence of the off-center axis images and, consequently, it has heretofore been impossible to realize these advantages. In accordance with with the present invention, however, novel and practical solutions to this problem have been found and will now be considered.

*Description of magnetic deflection yoke*

Figure 4:
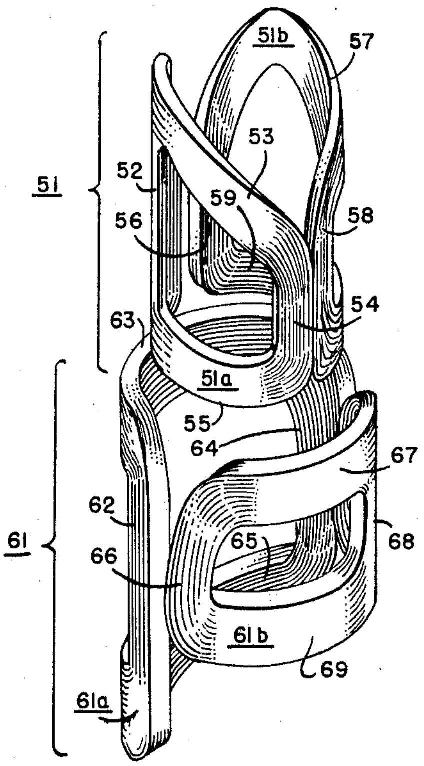
FIG. 4 is an exploded perspective view of the coils of one type of magnetic deflection yoke constructed in accordance with the present invention.

Referring now to FIG. 4 of the drawings, there is shown an exploded perspective view of a representative embodiment of a magnetic deflection yoke constructed in accordance with the present invention. As will be pointed out more fully hereinafter, there are two different modifications or techniques which may be applied to a conventional deflection yoke in order to obtain the desired alteration of the cathode-ray tube raster in order to minimize, for example, the distortion caused by oblique incidences of the image from the off-center axis projection unit on the viewing screen 10. These modifications may, in some cases, be applied to the deflection yoke together or, in other cases, one or the other technique may be utilized by itself to obtain the desired results. A deflection yoke as represented by the FIG. 4 drawing, which embodies both techniques, has been constructed and found to give satisfactory results in a color-projection set.

As mentioned, the modifications of the deflection yoke in accordance with the present invention fall into two general classes. One class or group relates to modifying the effective axial lengths of the yoke coils while the other type of modification relates to modifying the position or spacing of the longitudinal conductor groups of the yoke coils around the center axis of the cathode-ray tube. Solely for purposes of explanation and illustration, the following discussion of the deflection yoke and the various embodiments thereof shall be described and illustrated by yoke coils which are suitable for use as the yoke coils of the deflection yoke 34 of the projection system of FIG. 2. Obviously, of course, the invention is not intended to be limited to this particular representative application.

Considering now the construction of the deflection yoke of FIG. 4 in more detail, such deflection yoke comprises yoke coils for forming the scanning raster of a cathode-ray tube where, for one type of modification, the relative axial dimensions of the yoke coils are proportioned to produce oblique end boundaries of the magnetic deflection fields for minimizing the image distortion seen by the viewer. In particular, the deflection yoke may comprise a first set of yoke coils 51 for controlling deflection of the electron beam of the cathode-ray tube in one direction, the set of yoke coils 51 comprising longitudinal groups of conductors 52, 54, 56, and 58 which are to be positioned alongside of the longitudinal axis of the cathode-ray tube. With regard to the axial-length modification, the effective lengths of the conductor groups 54 and 58 on one side of the tube axis are different from the effective axial lengths of the conductor groups 52 and 56 on the other side of the tube axis. The conductor groups 52 and 54 may be connected together as shown in FIG. 4, for example, by groups of end turn conductors 53 and 55. In other words, the conductors groups 52, 53, 54, and 55 constitute a single yoke coil 51*a* which may be formed by suitably winding a conductor wire to form the single coil which, for the example of FIG. 4, is of a curved trapezoidal shape. It should be stressed, however, that it is the conductor groups 52 and 54 which are effective in deflecting the electron beam. The end turn groups 53 and 55 primarily serve to get the current from the conductors on one side of the conductors on the other side. Similar considerations hold for the conductor groups 56 and 58 which are joined by end turn groups 57 and 59 to form a single yoke coil 51*b*.

In accordance with the position modification which is included in the first set of yoke coils 51, the modification is that the conductor groups 52, 54, 56, and 58 are positioned around the tube axis so as to deliberately produce a controlled amount of curvature in the magnetic deflection field over the central region of the yoke. Such position modification may take the form as shown in FIG. 4 where the spacing between the neighboring conductor groups 52 and 56 of the two coils 51*a* and 51*b* on one side of the tube axis is substantially greater than the corresponding spacing between neighboring conductors groups 54 and 58 on the other side of the tube axis.

For correcting image distortion in both directions of the image, the magnetic deflection yoke may also include a second set of yoke coils 61 for controlling deflection of the electron beam of the cathode-ray tube in a second direction. The set of yoke coils 61 comprises longitudinal groups of conductors 62, 64, 66, and 68 which are to be positioned alongside of the longitudinal axis of the cathode-ray tube. To obtain the axial-length modification that may be practiced in accordance with the present invention, the effective axial length of the conductor groups 66 and 68 on one side of the tube axis is different from the effective axial length of the conductor groups 62 and 64 on the other side of the tube axis. The short conductor groups 66 and 68 are joined together by the end turn groups 67 and 69 to form a short yoke coil 61*b* of roughly a curved rectangular shape while the longer conductor groups 62 and 64 are joined together by the end turn conductor groups 63 and 65 to form a longer yoke coil 61*a* also of roughly a curved rectangular shape. As an illustration of the position modification of the present invention, each of the groups of longitudinal conductors 62, 64, 66, and 68 is positioned at an oblique angle relative to the axis of the cathode-ray tube in order to produce additional curvature of the magnetic deflection field over the central region of the yoke.

In operation, the yoke coils of set 51 are placed within the yoke coils of set 61 and both sets are slipped over the neck portion of the cathode-ray tube and positioned as indicated, for example, by the deflection yoke outline 34 of FIG. 2. The inner set of yoke coils 51 should be chosen to provide electron beam deflection in the horizontal image direction while the outer set 61 should preferably provide the deflection in the vertical image direction. This is because more power is required for the horizontal image deflection and such power requirements are held to a minimum if the horizontal deflection coils are smaller and more compact in size. Also, a sheath of iron core material (not shown) may be placed around the exterior of the deflection yoke assembly to form a return path for the magnetic flux developed by the yoke coils.

As mentioned, the representative deflection yoke shown in FIG. 4 contains examples of both the axial-length modification and the position modification taught by the present invention in order to control the shape of the cathode-ray tube raster to minimize image distortion seen by the viewer. In order to more readily obtain an understanding of these techniques for altering the raster shape and also because such techniques need not both be applied in a given application, the two techniques shall be considered separately with frequent reference back to the complete yoke of FIG. 4 to illustrate how a typical combination of the two techniques appears when applied to a practical form of deflection yoke for a particular representative situation.

In order to assist in the correlation of the various illustrations which follow, a particular technique has been utilized in connection with the reference numerals. In particular, the elements in the subsequent illustrations which correspond generally in position to elements of the FIG. 4 deflection yoke shall be designated by placing a number corresponding to the figure number in front of the reference number used for the corresponding part in FIG. 4.

*Deflection yoke modification illustrated by FIGS. 5a–5c and FIGS. 6a–6c*

In order to understand the operation of the technique of modifying various axial lengths of the yoke elements, reference is now made to FIGS. 5*a*, 5*b*, and 5*c* wherein FIG. 5*b* shows a plan view of the set of horizontal deflection coils corresponding to the set of coils 51 of FIG. 4 but showing only the axial-length modification and FIG. 5*a* shows a magnetic deflection field 70 produced by such coils and the operating position of such deflection field 70 relative to a cathode-ray tube which, for the sake of example, may be taken as being the cathode-ray tube 12 of FIG. 2. FIG. 5*c* shows a cross section of the set of horizontal deflection coils taken along the section line C—C of FIG. 5*b*. In operation, as best shown by FIG. 5*c*, the longitudinal conductor groups 552 and 554, which are connected in series by the end turns 553 and 555, produce vertical lines of flux in, for example, the downward direction as indicated by the representative flux line 71. Similarly, the longitudinal conductor groups 556 and 558 also produce downward flux lines which augment the flux developed by the upper groups 552 and 554. Accordingly, in the plan view of FIG. 5*a*, the flux lines of the magnetic field 70 are at right angles to the plane of paper.

The difference in the axial length of the conductor groups on the two sides of the cathode-ray tube axis is effective to produce an oblique end boundary 70*a* at the beam exit end of the deflection field 70. This oblique end boundary 70*a* serves to predistort the image formed on the phosphor screen 24 of the cathode-ray tube 12 by providing the horizontal image component of the keystone predistortion indicated by the raster outline 44' which is the outline of the raster produced on phosphor screen 24 and not the viewing screen 10. The desired predistortion is produced because when the electron beam is being deflected to the left side of the center axis 27 of the cathode-ray tube 12, the beam stays within the deflection field longer and, hence, suffers a greater amount of horizontal deflection. Conversely, when the electron beam is deflected on the right side of the tube axis 27, it emerges from the deflection field sooner and, hence, suffers a decreased amount of horizontal deflection.

Referring now to FIGS. 6*a*, 6*b*, and 6*c*, there is shown in detail the operation of the set of vertical deflection coils 661*a* and 661*b* in producing the desired predistortion in the vertical image direction. In this case, as indicated in FIG. 6c, the series-connected conductor groups 662 and 664, together with the series-connected conductor groups 666 and 668, are effective to produce horizontal flux lines as represented by the flux line 72. In this manner, there is produced a vertical deflection field 73, the plan view of which is indicated in FIG. 6a. Oblique end boundaries are produced at both the beam entrance end 74 and the beam exit end 75 of the deflection field 73 because of the relative difference in the axial lengths of the conductor groups 662 and 664 on one side of the tube axis with respect to conductor groups 666 and 668 on the other side, as best indicated in FIG. 6b. The horizontal flux lines of the deflection field 73 are effective to produce the vertical deflection of the electron beam. The oblique end boundary at the entrance end 74 is of secondary importance in producing the deflection of the electron beam because the electron beam enters the deflection field at the center thereof and, hence, this boundary 74 will be ignored for the moment. The oblique end boundary at the exit end 75, however, is effective to produce the vertical component of the desired predistortion of the image on the screen 24 of the cathode-ray tube 12. This is because when the electron beam is on the left-hand side of the tube axis 27, it stays within the deflection field 73 longer and, hence, suffers greater deflection in the vertical direction. Conversely, when the beam is being deflected on the right-hand side of the tube axis 27, it emerges from the field 73 sooner and, hence, suffers a leaser amount of deflection in the vertical direction.

The flux adjacent the end boundaries of both of the magnetic fields 70 and 73 is not actually composed of straight and parallel lines as indicated in the drawings for explanatory purposes but, from a practical standpoint, a substantial component of each of the end fields does produce the effect indicated by the pictorial representation and this is particularly true over the central region adjacent the cathode-ray tube axis. Consequently, the image produced on the screen 24 of the cathode-ray tube 12 is in the shape of a keystone, as indicated by the outline 44′. By comparing this outline with the corresponding outline 44 of FIG. 2, it will be seen that the predistorted keystone on the screen of the cathode-ray tube is in the opposite sense from that on the viewing screen 10. As a result, the predistorted image 44′ when projected onto the viewing screen 10 at an oblique angle, indicated by the light path 20, produces the desired image having a rectangular outline coinciding with the outline 45 of FIG. 2. Especially important is the fact that each red image element produced by the cathode-ray tube 12, assuming the tube 12 produces the red image, is now accurately superimposed on the corresponding green element produced by the cathode-ray tube 13 and this superposition obtains over the entire area of the viewing screen 10.

The keystone distortion that would be produced by the oblique incidence of the image from the blue cathode-ray tube 14 is corrected in a similar manner by shaping the yoke coils of the deflection yoke 36 in the same manner as the yoke coils of the deflection yoke 34. The longer conductor groups and shorter conductor groups are interchanged so as to predistort the blue cathode-ray tube image to correct for the keystone-shaped image outline 46 on the viewing screen 10. In other words, provided the tilt angle $\beta$ is the same for both cathode-ray tubes 12 and 14, the deflection yoke 36 on the cathode-ray tube 14 is the same as the deflection yoke 34 except that the deflection yoke as a whole must be rotated 180°. As mentioned, no correction is needed for the center cathode-ray tube 13.

A matter of importance which should also be considered are the nonuniformities or field curvatures produced in the magnetic deflection fields by the above-mentioned coil shaping. These field curvatures tend to cause spot distortion or astigmatism for some regions of beam travel especially where relatively large deflection angles are utilized. In the case of the horizontal deflection coils 551a and 551b, such spot distortion may be minimized to some extent by, for example, rounding off the sharp front end corner of the yoke coils as indicated by the dashed line construction 76, 77 of FIG. 5b as well as by altering the entrance boundary 70b as indicated by the dashed line construction 78, 79 of FIG. 5b. Similarly, for the vertical deflection coils, the oblique entrance boundary 74, shown in FIG. 6a, serves to minimize spot distortion. This end boundary is controlled by shifting the position of the short yoke coil 661b in an axial direction. The reason the modified entrance boundaries serve to minimize spot distortion is because the integration of the various magnetic gradients which the electron beam path may experience in traversing the deflection yoke will average out to zero. In other words, there may first be provided spot distortions of one polarity at one end of the deflection field to cancel the later spot distortions of an opposite polarity at the other end of the deflection field.

Another factor that has been found to occur in the operation of the projection system is the occurrence of transient differences in the positions of red, green, and blue image elements which should be superimposed. This occurs when the time constant of the horizontal deflection coils, that is, the ratio of inductance to resistance, is not the same for each of the three deflection yokes 34, 35, and 36. Accordingly, the time constants for the horizontal coils of these three yokes should be made the same. Similar considerations apply to the vertical deflection coils of the three deflection yokes 34, 35, and 36, only, in this case, it may be necessary to vary the number of winding turns in the shorter deflection coils of the two distortion-correcting deflection yokes 34 and 36 in order to get the time constants properly adjusted.

It should be stressed that a deflection yoke constructed in accordance with the present invention need not take the precise form as shown in FIG. 4. In other words, the concept of the present invention of modifying the axial lengths of the conductor groups which are effective in producing the electron beam deflection is not limited to the case of the curved rectangular-type coils shown but, for example, may also be readily applied where the yoke coils are of either the saddle or toroidal type. The only basic difference will be in the position and shape of the end turn or, better, the current return conductor groups. For example, the saddle-type coils would be like the coils shown in FIG. 4 except that the end turn conductor groups would be lifted up and fanned out to give the typical saddle yoke shape.

As previously mentioned for the specific example being discussed, the inner set of coils 51 should provide the horizontal image deflection while the outer set of coils 61 should provide deflection in the vertical image direction. Now, assuming that optical unit of the projection system are positioned differently from that shown in FIG. 2, such that the narrow or squeezed portion of the keystone wedge is at either the top or the bottom of the viewing screen instead of at one side or the other as shown in FIG. 2, then the shapes of the horizontal and vertical deflection coils as shown in FIG. 4 should preferably be interchanged. In other words, what is shown in FIG. 4 as the outer coils would then become the inner coils and would provide the horizontal deflection while what is shown in FIG. 4 as the inner coils would then become the outer coils and would provide the vertical deflection.

*Deflection yoke modification illustrated by FIGS. 7a–7f, FIGS. 8a–8d, and FIGS. 9a–9d*

The technique just considered for producing the desired precorrection or shaping of the raster pattern developed on the face of the cathode-ray tube may not, depending on the operating conditions and circumstances, be sufficient to produce the desired raster shaping without also introducing an undesirable amount of spot distortion of the electron beam at the point where it strikes the phosphor screen. In particular, as the current density of the electron beam is increased, the thickness of the electron beam as it passes through the deflection yoke is also increased. This increase in thickness may be sufficiently great, depending on the operating conditions, so that any nonuniformities in the deflection fields serve to distort this spot whenever it is deflected through such a nonuniform field region. In producing the oblique end boundaries necessary for a trapezoidal or keystone-shaped raster for example, certain nonuniformities are introduced into the magnetic field which serve to produce this spot distortion. As a result, it may be necessary to apply the technique of modifying the positions of the longitudinal conductor groups as will now be discussed in detail. Also, it shall be shown that such technique of positioning the longitudinal conductor groups is effective, in its own right, to produce a trapezoidal shape in the raster pattern. In other words, both the axial-length technique and the positioning technique are capable of producing a trapezoidal shape and both are capable of introducing spot distortion. The important feature, however, is that the relationships between the raster shaping and spot distortion for the two techniques are different, as will presently be considered. By selecting a proper combination of the two techniques, it is possible to have the shaping effects combine in an additive manner while the spot distortion effects combine in a subtractive or canceling manner. As a result, where the operating conditions and circumstances require application of both of these techniques, both such techniques may be applied in the proper combination to produce a desired shaping or precorrection of the cathode-ray tube raster without introducing an objectionable amount of spot distortion. As mentioned, however, in some circumstances one or the other of these two techniques may be capable by itself of giving the desired results.

Considering in more detail the technique of positioning the longitudinal conductors of the yoke coils, reference is now had to FIG. 7*a* which is a plan view of one type of modification of, for example, the vertical deflection coils, represented by the coils 761*a* and 761*b*, which may be utilized to obtain shaping of the cathode-ray tube raster pattern with a minimum of spot distortion. The coils 761*a* and 761*b* are characterized by the fact that the groups of longitudinal conductors 762, 764, 766, and 768 are positioned at an oblique angle relative to the axis 27 of the cathode-ray tube 12. This may be best seen for the conductor groups 764 and 768 by referring to FIG. 7*b* which shows the coils laid out flat.

The effect of such modification may be understood by referring to FIGS. 7*c* and 7*e* which are cross-sectional views taken along the section lines C—C and E—E, respectively, of FIG. 7*a*. Considering FIG. 7*c*, this cross-sectional view represents the cross section of the coils 761*a* and 761*b* at approximately the beam exit end of the yoke. As seen by considering the position of the groups or bundles of longitudinal conductors 762, 764, 766, and 768 of FIG. 7*c*, such conductor groups are spaced around the center axis of the cathode-ray tube in an asymmetrical manner and serve to produce curvature of the magnetic deflection field over the central deflection region of the yoke as represented by the region within the neck of the cathode-ray tube 12. The field curvature is represented by the curvature of representative lines of magnetic flux 100–104.

The important consideration regarding the positioning of the longitudinal conductor groups shown in FIG. 7*c* is that the centers 762', 764', 766', and 768' of each conductor group or bundle have been shifted from the conventional 30° axis represented by axes 105 and 106. To understand the importance of this, consideration must be had of the fundamental deflection yoke theory that, in order to produce a uniform field region over the central region of a deflection yoke by means of coils, such as the coils 761*a* and 761*b* on opposite sides of the central region, it is necessary that the centers of neighboring conductor groups of the different coils, for example, the conductor group centers 762' and 766', be separated by an angle of 60° while the angular separation between conductor group centers, for example, the centers 762' and 764', of the same coil must be 120°. As is indicated in FIG. 7*c* by the positions of the conductor group centers 762', 764', 766' and 768', this ideal spacing is departed from and, as expected, curvature of the field results.

For present purposes, such curvature of the field is permissible because it shall be controlled to produce desired shapings of the raster pattern. In this regard, reference is made to FIG. 7*d* which illustrates the outline of the region scanned by the electron beam in a plane corresponding approximately to the section line C—C of FIG. 7*a* provided, of course, that other coils (not shown in FIG. 7*a*) are provided for producing conventional deflection in the horizontal direction. In other words, FIG. 7*d* illustrates what would result were only the vertical deflection coils of a complete deflection yoke to be modified. It will be seen that the stronger deflection field region produced by positioning the conductor groups 762 and 764 closer together has expanded the vertical deflection over the left-hand portion of FIG. 7*d* while the weaker field region resulting from moving the conductor groups 766 and 768 farther apart has tended to decrease the vertical deflection over the right-hand portion of FIG. 7*d*. The resulting scanning raster has taken on a general trapezoidal shape.

Spot distortion caused by the curved field at the exit end of the yoke may be controlled by providing an opposite type of field curvature at the entrance end of the yoke. Thus, as indicated by FIG. 7*e*, the spacing resulting from the placing of the conductor groups at oblique angles relative to the cathode-ray tube axis causes a reverse curvature field at the beam entrance end of the yoke. As a result, the over-all spot distortion may be suitably minimized. In particular, such spot distortion might be exaggerated in a sense opposite to the sense of the spot distortion introduced by practicing the axial-dimensioning technique previously considered in connection with earlier figures. FIG. 7*f* is an approximate illustration of the outline of the region scanned by an electron beam in a plane corresponding to the section line E—E of FIG. 7*a*. The relative size of the FIG. 7*f* outline illustrates the fact that both the spot distortion and the amount of beam deflection experienced by the electron beam near the entrance end of the yoke are substantially smaller than the corresponding factors at the beam exit end of the yoke.

In order to illustrate the fact that the technique of modifying the conductor group position has other applications above and beyond is application in the color-projection receiver, reference is now made to FIG. 8*a* of the drawings which is a plan view of a set of vertical yoke coils which may be utilized in, for example, a monochrome television receiver to minimize, for example, the vertical component of the well-known pincushion type of raster distortion. FIG. 8*b* shows the coils 861*a* and 861*b* of FIG. 8*a* laid out in a flat manner to illustrate the shape and relative orientation of the coils. FIG. 8*c* is a cross-sectional view taken along the section line C—C of FIG. 8*a* and shows the positioning of the coils at the beam exit end of the yoke due to the oblique angle of the longitudinal conductor groups 862, 864, 866, and 868 relative to the center axis 27 of the cathode-ray tube 12. In particular, the neighboring conductor groups at the beam exit end of the yoke, for example the conductor groups 862 and 866 have been brought closer together. As indicated, this is accompanied by a displacement of the centers 862', 864', and 866' of each of the conductor groups away from the conventional 30° axes 110 and 111. As a result, curvature of the magnetic deflection field, as indicated by the representative flux lines 112–115, is produced. Similar considerations hold for the lower tube conductor groups 864 and 868.

The effect of all of this on the cathode-ray tube raster is illustrated in FIG. 8*d* which represents the possible outlines of the region scanned by the electron beam in a plane corresponding to the section line C—C of FIG. 8*a*, assuming, of course, that some provision for providing conventional deflection in the horizontal direction is also provided. More particularly, the solid line outline 116 represents the scanning raster where it suffers pincushion distortion. The effect of modifying the positions of the longitudinal conductor groups 862, 864, 866, and 868 is to strengthen the deflection field at the center region of both the top and bottom parts of the raster. Such modification tends to pull the center portions of the top and bottom edges outward to the dotted line positions 117 and 118. Additional similarly shaped pairs of deflection coils may then be used to provide the horizontal deflection and thereby correct the pincushion distortion along the right- and left-hand edges of the raster. Thus, it appears that the technique of modifying the positions of the longitudinal conductor groups, that is, the positions of the group centers, may be used to correct image distortions which would otherwise be visible to the viewer.

The curvature of the deflection field indicated by the flux lines of FIG. 8*c* also gives rise to distortion of the electron-beam writing spot, that is, it distorts the shape of the electron-beam spot on the phosphor screen. This may be corrected, as previously indicated, by exposing the beam to field curvature of the opposite sense at the other end, i.e., the beam entrance end, of the yoke. This reverse sense field curvature is provided by having the neighboring conductor groups at the beam entrance end separated by more than a conventional distance from one another. This separation is achieved as a result of the oblique angle of the longitudinal conductor groups 862, 864, 866, and 868 relative to the longitudinal center axis 27 of the cathode-ray tube 12.

Referring back to FIG. 4 of the drawings, it will be pointed out that the positioning techniques of placing the longitudinal conductor groups at oblique angles relative to the cathode-ray tube axis is practiced in the set of vertical deflection coils 61, as indicated by the oblique angle of the conductor groups 62, 64, 66, and 68. The case illustrated in FIG. 4 is, roughly, the reverse of that indicated in FIG. 8*a*, that is, the conductor groups are closer together at the beam entrance end as opposed to being closer together at the beam exit end, as shown in FIG. 8*a*. This relation together with the results obtained by making one coil **61*b* shorter than the other coil 61*a*** produces the desired vertical component of the keystone precorrection of the raster with a minimum of spot distortion.

Considering now the application of the positioning technique to the set of horizontal deflection coils 51 of FIG. 4, reference is now had to FIG. 9*a* of the drawings which is a plan view of a set of horizontal deflection coils. Only the upper coil **951*a*** is, of course, visible in this view. FIG. 9*b* is a cross-sectional view taken along the section line B—B of FIG. 9*a* and shows both the upper and the lower coils as represented by the conductor groups 952 and 954 and the conductor groups 956 and 958, respectively. The positioning in this case is achieved by increasing the gap or spacing between neighboring conductor groups, for example, the conductor groups 952 and 956 on one side of the tube axis while decreasing the gap or spacing between the neighboring conductor groups, for example, the groups 954 and 958 on the other side of the tube axis. The effect on the magnetic deflection field may be understood by noting the shift of the conductor group centers 952', 954', 956', and 958', as indicated by the reference axes 120 and 121 which are drawn through the group centers of each coil. The result has been to tilt the plane of each of the coils. The resulting deflection field is indicated by the flux lines 123–126 of FIG. 9*c* which is identical to FIG. 9*b* except that the flux lines have been shown and the various reference axes have been omitted. The effect on the scanning raster is indicated by the outlines of FIG. 9*d* where the dotted outline 128 represents the normal scanning raster and the solid line outline 129 represents the scanning raster produced when the longitudinal conductor groups are spaced in the manner indicated in FIG. 9*c*.

Using the concept, which is perfectly valid and legitimate, that the electron beam is attracted towards a conductor group when such group is energized, then it will be seen that the right-hand side of the raster is pulled in more closely towards the more closely spaced conductor groups 954 and 958 while the left-hand corners of the raster are pulled in the direction of the conductor groups 952 and 956. There is an over-all shift of the raster pattern towards the right because the magnetic deflection field is stronger where the conductor density is greater.

Considering now the spot distortion, it will be noted that such distortion caused by curvature of the field is not, in this case, compensated by producing a reverse sense field curvature. This is because the positioning is the same at both the entrance and exit ends of the deflection yoke. By properly selecting the sides on which the spacing is to be increased and the sides on which it is to be decreased, however, such spot distortion may be made of a sense opposite to the distortion produced by practicing the axial-length modification indicated in connection with FIGS. 5*a*–5*c*. In this manner, as illustrated by the horizontal deflection coils 51 of FIG. 4, both the axial-length and positioning techniques may be utilized to supply the horizontal component of the keystone precorrection with a minimum of spot distortion.

It should be noted that throughout the foregoing discussions the terms "vertical" and "horizontal" were used in reference to the different yoke coils simply for sake of clarity and ease of understanding. In other words, depending on the orientation of the cathode-ray tubes relative to the final image produced on the viewing screen 10 in the projection system of FIG. 2, the corrections illustrated as being applied to the vertical coils might, instead, be applied to the horizontal coils and vice versa.

As previously mentioned, the techniques of modifying the axial lengths and of modifying the positioning of the longitudinal conductor groups may, in a given application, both be applied together or else one or the other technique may be used separately in varying degrees depending on the particular circumstances of the application. The representative deflection yoke of FIG. 4 makes use of both techniques and has been found to give the desired performance in a color-projection system of the type represented in FIG. 2.

*Multiple mirror system of FIG. 1a receiver*

As previously mentioned, the color-television receiver of compact dimensions illustrated by the representative embodiment of FIG. 1*a* includes small cathode-ray tubes 12, 13, and 14 for individually forming component color images of a composite multicolor image and optical projection units 16, 17, and 18 for each cathode-ray tube, such optical units being positioned side-by side in a line and adjusted to project the component color images along converging light paths to super-impose such images on the viewing screen 10 of the receiver of FIG. 1*a*. The cross-sectional view of FIG. 1*a* shows only the nearest cathode-ray tube 12 and its optical projection unit 16, the other two units being located behind the unit 16 and, hence, not being visible in this view. In addition, the receiver of FIG. 1*a* includes multiple mirrors, represented by the mirrors 31, 32, and 33, external to the optical units 16, 17, and 18 and common to the converging light paths and positioned to provide multiple folds in such light paths thereby requiring a minimum of cabinet space for such light paths. Such folds in the light paths reduce the required cabinet space because the same cabinet space may be used for more than one portion of each light path.

Such technique is practical, however, only because the crossed dichroic mirror unit formerly required in receivers of the projection type has been eliminated. In this regard, the side-by-side in line positioning of the optical units 16, 17, and 18 is in contrast to the case where the crossed dichroic mirrors are used because, in this latter case, the three optical projection units are attached to three sides of the dichroic mirror box.

The use of multiple mirrors, as shown in FIG. 1*a*, for reducing the required cabinet volume is not practical where the crossed dichroic mirrors are utilized because of the added bulk of the dichroic mirror itself and because the optical units, for example the optical unit 16, would be attached to the dichroic mirror box and it would then not be possible to place the first of the multiple mirrors, namely, the mirror 31 close to the exit aperture of the optical unit 16. It is necessary that the first of the multiple mirrors, namely, the mirror 31 be placed close to the exit aperture of the optical units, as indicated by the correction lens 26, in order that the mirror 31 may intercept the light beams before they have diverged appreciably. Otherwise, a much larger size would be required of the mirror 31.

Figure 1B:
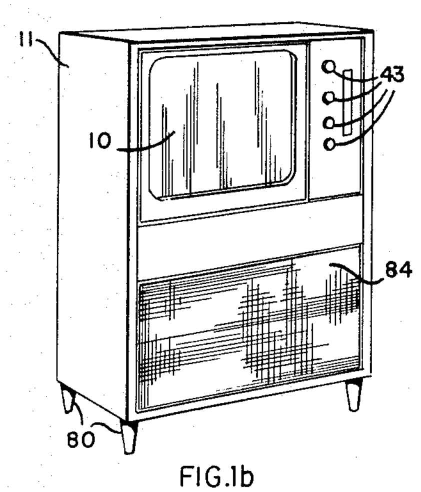

As a result of eliminating the crossed dichroic mirrors, the reduced bulk of the projector unit, and making use of the multiple mirrors 31, 32, and 33 for producing multiple folds in the light paths, the over-all dimensions of the receiver cabinet, as illustrated in FIG. 1*b*, may be of a much more pleasing size for use in the average home. In particular, the front-to-back depth of the receiver cabinet 11 shown in FIG. 1*b* need only be 17 inches. This should be contrasted with the over-all front-to-back depth of about 28 inches required by color receivers using direct-view tricolor picture tubes of a comparable display screen size. In this regard, it should be mentioned that the display screen 10 of the FIG. 1*b* receiver has a 300 square inch area which corresponds approximately to the picture screen area of a 24-inch picture tube. The height of the receiver cabinet 11, neglecting the legs 80, need only be about 40 inches.

Another feature of the color-television receiver of FIG. 1*a* is the fact that various adjustment devices associated with each of the optical projection units 16, 17, and 18, such as, for example, the focus control 81 and the centering control 82 of the optical unit 16, are readily accessible from the front side of the receiver cabinet 11 by way of a displaceable panel 84 thereof. This is highly important because it enables the cathode-ray tubes and optical units to be properly adjusted and aligned from the front side of the receiver so that the viewing screen image may be observed by the person making the adjustment thereby reducing the time and effort required for such adjustments.

*Table-model receiver of FIG. 10a*

Referring now to FIG. 10*a* of the drawings, there is shown a novel and particularly compact construction for a color-projection receiver of the table-model type. Such receiver, as shown in the cross-sectional view of FIG. 10*a*, utilizes the three optical projection units 16, 17, and 18 at the bottom of receiver cabinet 90 to project the images in an upward direction, only the end unit 16 being visible. In addition, the receive utilizes a first mirror 91 positioned adjacent the top of the receiver cabinet 90 for projecting the converging light paths that are projected thereon by the three optical projection units 16, 17, and 18 towards the back of the receiver cabinet. The receiver further includes a second mirror 92 positioned adjacent the back of the receiver cabinet for further directing the converging light paths towards the viewing screen 93 at the front of the receiver cabinet. This leads to a particularly compact form of construction as a substantial portion of the cabinet volume is traversed three times by the light path leading to the viewing screen 93.

A perspective view of the table-model receiver is shown in FIG. 10*b*. The display screen area is again 300 square inches while the front-to-back depth of the receiver cabinet is 20 inches and the height of the cabinet, neglecting the legs, is 27 inches. As indicated by the control knobs 94, the accompanying electronic circuits may be located on a vertically mounted chassis which is attached to the side of the receiver cabinet 90. This receiver also includes the advantage of having the adjustment devices associated with the optical projection units accessible from the front side of the receiver cabinet by way of a displaceable panel 95 thereof.

CONCLUSIONS

Color-television receivers of the projection type when constructed in accordance with the present invention, as illustrated by the representative embodiment of FIGS. 1*a* and 10*a*, have the advantage of being less costly and more compact because the crossed dichroic mirrors formerly required in color-projection systems have been eliminated. The compactness is achieved by the technique of placing the optical units side-by-side in a line and also by use of the multiple mirror technique of producing multiple folds in the light paths. None of these techniques, however, would be readily practical without also providing a solution to the problem of the keystone distortion which results from image projection by off-center-axis projection units. The present invention overcomes this keystone problem by using a novel construction of the deflection yokes associated with the off-center-axis projection units. As a result, these deflection yokes not only perform their normal functions of developing the cathode-ray tube scanning rasters but also perform the additional function of correcting the keystone distortion. For this reason there is no substantial increase in the cost of the deflection yokes because it is no more difficult to manufacture yoke coils modified in accordance with the present invention than it is to manufacture conventional yoke coils. Also, the techniques used in modifying the construction of the deflection yokes for the off-axis units are applicable to other cathode-ray tube applications, such as, for example, in a monochrome television receiver, to minimize distortion of the pincushion type. Another fertile field for these yoke techniques is in overcoming some of the problems encountered in cathode-ray tubes which use a wide deflection angle.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A magnetic deflection yoke for use with a cathode-ray tube image-reproducing system where oblique incidence of energy on an image surface causes image distortion, the deflection yoke comprising: a set of yoke coils for controlling deflection of the electron beam of the cathode-ray tube in one direction, said set of yoke comprising longitudinal groups of conductors which are to be positioned alongside of the longitudinal axis of the cathode-ray tube, the effective axial length of the conductor groups on one side of the tube axis being different from the effective axial length of the conductor groups on the other side of the tube axis to produce an oblique end boundary of the magnetic deflection field for minimizing the image distortion seen by the viewer.

2. A magnetic deflection yoke for use with a cathode-ray tube image-reproducing system where oblique incidence of energy on an image surface causes image distortion, the deflection yoke comprising: a first set of yoke coils for controlling deflection of the electron beam of the cathode-ray tube in a first direction and a second set of yoke coils for controlling deflection of the electron beam in a second direction, the total deflection of the electron beam forming the scanning raster of the cathode-ray tube; each set of yoke coils comprising longitudinal groups of conductors which are to be positioned alongside of the longitudinal axis of the cathode-ray tube, the effective axial length of the conductor groups of each set being longer on one side of the tube axis than on the other, thereby to produce oblique end boundaries of the magnetic deflection fields for minimizing the image distortion seen by the viewer.

3. A magnetic deflection yoke for use with a cathode-ray tube image-reproducing system where oblique incidence of energy on an image surface causes image distortion, the deflection yoke comprising: a first set of yoke coils for controlling deflection of the electron beam of the cathode-ray tube in a first direction and a second set of yoke coils for controlling deflection of the electron beam in a second direction, the total deflection of the electron beam forming the scanning raster of the cathode-ray tube; each set of yoke coils comprising longitudinal groups of conductors which are to be positioned alongside of the longitudinal axis of the cathode-ray tube, the effective axial length of the conductor groups of each set being longer on one side of the tube axis than on the other, the longer conductor groups of the first set being on the same side of the tube axis as the longer conductor groups of the second set, thereby to produce oblique end boundaries of the magnetic deflection fields for minimizing the image distortion seen by the viewer.

4. A magnetic deflection yoke for use with a cathode-ray tube image-reproducing system where oblique incidence of energy on an image surface causes image distortion, the deflection yoke comprising: an inner set of yoke coils to be positioned next to the neck of the cathode-ray tube for controlling deflection of the electron beam of the cathode-ray tube in the horizontal image direction and an outer set of yoke coils to be positioned next to the inner set for controlling deflection of the electron beam in the vertical image direction, the total deflection of the electron beam forming the scanning raster of the cathode-ray tube, each set of yoke coils comprising longitudinal groups of conductors which are to be positioned alongside of the longitudinal axis of the cathode-ray tube, the effective axial length of the conductor groups of each set being longer on one side of the tube axis than on the other, the longer conductor groups of the first set being on the same side of the tube axis as the longer conductor groups of the second set, thereby to produce oblique end boundaries of the magnetic deflection fields for minimizing the image distortion seen by the viewer.

5. A magnetic deflection yoke for use with a cathode-ray tube image-projection system where oblique incidence of image light on a viewing screen causes keystone distortions such that one-half of the image seen by the viewer is contracted and the other half is expanded, the deflection yoke comprising: a first set of yoke coils for controlling deflection of the electron beam of the cathode-ray tube in a first direction and a second set of yoke coils for controlling deflection of the electron beam in a second direction, the total deflection of the electron beam forming the scanning raster of the cathode-ray tube, each set of yoke coils comprising longitudinal groups of conductors which are to be positioned along side of the longitudinal axis of the cathode-ray tube, the effective axial length of the conductor groups of each set being longer on the contracted-image side of the tube axis than on the expanded-image side, thereby to produce oblique end boundaries of the magnetic deflection fields for predistorting the image in a reverse sense to minimize the keystone distortion seen by the viewer.

6. A magnetic deflection yoke for use with a cathode-ray tube image-reproducing system for altering the shape of the cathode-ray tube raster to minimize image distortion seen by the viewer, the deflection yoke comprising: a pair of yoke coils for controlling deflection of the electron beam of the cathode-ray tube in one direction, said pair of yoke coils each comprising two longitudinal groups of conductors which are to be positioned alongside of the longitudinal axis of the cathode-ray tube, each group of longitudinal conductors being positioned at an oblique angle relative to the tube axis, the two conductor groups of one coil being nearer a reference plane through the tube axis at the beam-entrance end of the yoke than at the beam-exit end of the yoke and the two conductor groups of the other coil being nearer the same reference plane at the beam-exit end of the yoke than at the beam-entrance end of the yoke to produce curvature of the magnetic deflection field over the central region of the yoke for obtaining the desired alteration of the raster.

7. A magnetic deflection yoke for use with a cathode-ray tube image-reproducing system for altering the shape of the cathode-ray tube raster to minimize image distortion seen by the viewer, the deflection yoke comprising: a set of yoke coils for controlling deflection of the electron beam of the cathode-ray tube in one direction, said set of yoke coils comprising longitudinal groups of conductors which are to be positioned alongside of the longitudinal axis of the cathode-ray tube, the group of longitudinal conductors being spaced around the tube axis in an asymmetrical manner to produce curvature of the magnetic deflection field over the central region of the yoke, that curvature being asymmetrical with reference to two mutually perpendicular reference planes having their line of intersection positioned essentially along the tube axis for obtaining the desired alteration of the raster.

8. A magnetic deflection yoke for use with a cathode-ray tube image-reproducing system for altering the shape of the cathode-ray tube raster to minimize image distortion seen by the viewer, the deflection yoke comprising: a pair of yoke coils for controlling deflection of the electron beam of the cathode-ray tube in one direction, said pair of yoke coils each comprising two longitudinal groups of conductors which are to be positioned alongside of the longitudinal axis of the cathode-ray tube so that the spacing between neighboring conductor groups of the two coils on one side of the tube axis is substantially greater than the corresponding spacing on the other side of the tube axis to produce curvature of the magnetic deflection field over the central region of the yoke for obtaining the desired alteration of the raster.

9. A magnetic deflection yoke for use with a cathode-ray tube image-reproducing system for altering the shape of the cathode-ray tube raster to minimize image distortion seen by the viewer, the deflection yoke comprising: a first set of yoke coils for controlling deflection of the electron beam of the cathode-ray tube in a first direction and a second set of yoke coils for controlling deflection of the electron beam in a second direction, the total deflection of the electron beam forming the scanning raster of the cathode-ray tube, each set of yoke coils comprising longitudinal groups of conductors which are to be positioned alongside of the longitudinal axis of the cathode-ray tube, the conductor groups of one set being positioned at oblique angles relative to the tube axis and the conductor groups of the other set being positioned around the tube axis so that the spacing between neighboring conductor groups on one side of the tube axis is substantially greater than the spacing between the neighboring conductor groups on the other side of the tube axis, thereby to produce curvature of the magnetic deflection fields over the central region of the yoke for obtaining the desired alteration of the raster.

10. A magnetic deflection yoke for use with a cathode-ray tube image-reproducing system for altering the shape of the cathode-ray tube raster to minimize image distortion seen by the viewer, the deflection yoke comprising: a first set of yoke coils for controlling deflection of the electron beam of the cathode-ray tube in a first direction and a second set of yoke coils for controlling deflection of the electron beam in a second direction, the total deflection of the electron beam forming the scanning raster of the cathode-ray tube, each set of yoke coils comprising longitudinal groups of conductors which are to be positioned alongside of the longitudinal axis of the cathode-ray tube, the conductor groups of both sets being positioned at oblique angles relative to the tube axis the two conductor groups of one coil of at least one set of coils being nearer a reference plane through the tube axis at the beam-entrance end of the yoke than at the beam-exit end of the yoke and the two conductor groups of the other coil of the same set of coils being nearer the same reference plane at the beam-exit end of the yoke than at the beam-entrance end of the yoke to produce curvature of the magnetic deflection fields over the central region of the yoke, that curvature being asymmetrical with reference to two mutually perpendicular reference planes having their line of intersection positioned essentially along the tube axis for obtaining the desired alteration of the raster.

11. A magnetic deflection yoke for use with a cathode-ray tube image-reproducing system where oblique incidence of energy on an image surface causes image distortion, the deflection yoke comprising: a first set of yoke coils for controlling deflection of the electron beam of the cathode-ray tube in a first direction and a second set of yoke coils for controlling deflection of the electron beam in a second direction, the total deflection of the electron beam forming the scanning raster of the cathode-ray tube, each set of yoke coils comprising longitudinal groups of conductors which are are to be positioned alongside of the longitudinal axis of the cathode-ray tube, the effective axial length of the conductor groups of each set being longer on one side of the tube axis than on the other to produce oblique end boundaries of the magnetic deflection fields, the conductor groups of each set being positioned relative to one another around the tube axis to produce curvature of the magnetic deflection fields over the central region of the yoke, the oblique end boundaries and curvatures of the magnetic deflection fields serving to alter the shape of the raster for minimizing the image distortion seen by the viewer without introducing an objectionable amount of electron-beam spot distortion.

References Cited by the Examiner

UNITED STATES PATENTS 2,866,125 12/58 Haantjes et al. ---------- 313—84

FOREIGN PATENTS 463,217 2/50 Canada.

LARAMIE E. ASKIN, *Primary Examiner.*

JOHN F. BURNS, *Examiner.*